United States Patent
Kagoshima et al.

(10) Patent No.: US 8,286,740 B2
(45) Date of Patent: Oct. 16, 2012

(54) HYBRID WORKING MACHINE

(75) Inventors: Masayuki Kagoshima, Hiroshima (JP);
Masayuki Komiyama, Hiroshima (JP);
Keisuke Shimomura, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 555 days.

(21) Appl. No.: 12/581,299

(22) Filed: Oct. 19, 2009

(65) Prior Publication Data
US 2010/0102763 A1 Apr. 29, 2010

(30) Foreign Application Priority Data

Oct. 29, 2008 (JP) ................................ 2008-278785

(51) Int. Cl.
*B60W 10/08* (2006.01)
(52) U.S. Cl. .................... 180/65.27; 180/65.285; 701/50
(58) Field of Classification Search ............. 180/65.285, 180/65.27, 89.13; 701/50
See application file for complete search history.

(56) References Cited

U.S. PATENT DOCUMENTS

| | | | | |
|---|---|---|---|---|
| 4,907,667 A * | 3/1990 | Yamamoto et al. | ......... | 180/89.13 |
| 5,016,721 A * | 5/1991 | Yamamoto et al. | ......... | 180/89.13 |
| 6,170,588 B1 * | 1/2001 | Irino et al. | ................... | 180/89.1 |
| 6,615,942 B2 * | 9/2003 | Shinohara et al. | ......... | 180/69.21 |
| 6,711,838 B2 * | 3/2004 | Staub et al. | .................... | 37/348 |
| 6,735,486 B2 * | 5/2004 | Hoffelmeyer et al. | ......... | 700/80 |
| 6,789,335 B1 | 9/2004 | Kinugawa et al. | | |
| 6,895,699 B1 * | 5/2005 | Loeb | ............................... | 37/348 |
| 6,898,877 B1 * | 5/2005 | Loeb | ............................... | 37/348 |
| 8,190,334 B2 * | 5/2012 | Kagoshima et al. | ........... | 701/50 |
| 2004/0148817 A1 | 8/2004 | Kagoshima et al. | | |
| 2006/0108171 A1 * | 5/2006 | Koga et al. | .................... | 180/327 |
| 2006/0116797 A1 | 6/2006 | Moran | | |
| 2007/0214782 A1 | 9/2007 | Komiyama et al. | | |
| 2008/0082240 A1 * | 4/2008 | Kagoshima et al. | ........... | 701/50 |
| 2008/0093864 A1 | 4/2008 | Kagoshima et al. | | |
| 2008/0093865 A1 | 4/2008 | Komiyama et al. | | |
| 2008/0097661 A1 | 4/2008 | Moran | | |
| 2008/0121448 A1 | 5/2008 | Betz et al. | | |

(Continued)

FOREIGN PATENT DOCUMENTS

CN 101037869 A 9/2007

(Continued)

OTHER PUBLICATIONS

Extended Search Report issued Feb. 3, 2011, in European Patent Application No. 09174302.1-1264/2181905.

(Continued)

*Primary Examiner* — Jeffrey J Restifo
(74) *Attorney, Agent, or Firm* — Oblon, Spivak, McClelland, Maier & Neustadt, L.L.P.

(57) ABSTRACT

In a hybrid excavator, a generator motor and a hydraulic pump are driven by using an engine as a power source. A battery is charged with power generated by the generator motor. A rotation motor is driven by the generator motor and the battery. The voltage of a DC bus is detected by a voltage sensor, and whether the battery is unusable is determined by a breakdown detector. When the battery becomes unusable, emergency evacuation control is performed so that the power consumption of the rotation motor will be suppressed to be less than or equal to the power generation of the generator motor while maintaining the DC bus voltage greater than or equal to the normal operation voltage of the system.

3 Claims, 4 Drawing Sheets

U.S. PATENT DOCUMENTS

| | | |
|---|---|---|
| 2008/0177434 A1 | 7/2008 | Moran |
| 2008/0201045 A1* | 8/2008 | Kagoshima et al. ............ 701/50 |
| 2011/0071739 A1* | 3/2011 | Sano et al. ...................... 701/50 |
| 2011/0251746 A1* | 10/2011 | Wu et al. ......................... 701/22 |
| 2012/0101696 A1* | 4/2012 | Udagawa ........................ 701/50 |
| 2012/0109472 A1* | 5/2012 | Yanagisawa .................... 701/50 |

FOREIGN PATENT DOCUMENTS

| | | |
|---|---|---|
| EP | 1 383 224 A1 | 1/2004 |
| JP | 10-42587 | 2/1998 |
| JP | 2000-283107 | 10/2000 |
| WO | WO 2008/042319 A2 | 4/2008 |
| WO | WO 2008/042319 A3 | 4/2008 |

OTHER PUBLICATIONS

U.S. Appl. No. 13/084,759, filed Apr. 12, 2011, Kagoshima.

Chinese Office Action issued Sep. 15, 2011, in Patent Application No. 200910207920.X.

* cited by examiner

HYBRID WORKING MACHINE

BACKGROUND OF THE INVENTION

1. Field of the Invention

The present invention relates to a hybrid working machine that uses both engine power and electric power.

2. Description of the Related Art

The related art will be described using an excavator by way of example.

As illustrated in FIG. 4, an excavator includes a crawler-type lower traveling structure 101 and an upper rotating structure 102 rotatably mounted, around a vertical shaft O, on the lower traveling structure 101. A working attachment A is mounted on the upper rotating structure 102.

The working attachment A includes a boom 103 capable of moving up and down, an arm 104 attached to the tip of the boom 103, a bucket 105 attached to the tip of the arm 104, and cylinders 106, 107, and 108 that are hydraulic actuators for driving the boom 103, the arm 104, and the bucket 105, respectively.

For a hydraulic excavator, a rotation hydraulic motor is used as a rotation actuator for rotating the upper rotating structure 102. In contrast, for a hybrid excavator, a rotation motor is used as the rotation actuator.

In a hybrid excavator, a hydraulic pump and a generator are driven by using an engine as a power source, and hydraulic actuators are driven by the hydraulic pump. At the same time, a rotation motor is driven by the generator and an electric storage device that is charged with power output from the generator (See Japanese Unexamined Patent Application Publication Nos. 2000-283107 and 10-42587).

In the hybrid excavator, the electric storage device may break down due to a failure in a relay, and may become unusable as a power source.

In such a case, there have been the following problems:
(i) Because the electric storage device, which is the power charging destination of the power output from the generator and which is one of the power sources of the rotation motor, becomes unusable, the voltage of a direct current (DC) bus connecting the generator (generator inverter) and the rotation motor (rotation motor generator) becomes unstable;
(ii) The power generation of the generator becomes insufficient for the power consumption of the rotation motor; and
(iii) As the engine load becomes greater, the output of the hydraulic pump becomes smaller.
Accordingly, both the rotation and the hydraulic operation become unstable.

SUMMARY OF THE INVENTION

It is an object of the present invention to provide a hybrid working machine that ensures both the stable rotation and hydraulic operation thereof even when an electric storage device is unusable.

A hybrid working machine according to an aspect of the present invention includes the following elements: an engine serving as a power source; a hydraulic pump serving as a hydraulic power source of a hydraulic actuator, the hydraulic pump being driven by the engine; a generator driven by the engine; an electric storage device that is charged with electric power generated by the generator; a rotation motor serving as a driving source of a rotating structure, the rotation motor being driven by the generator and the electric storage device; an electric-storage-device breakdown detector that detects that the electric storage device is unusable; and a controller unit that controls the generator and the rotation motor. When it is detected by the electric-storage-device breakdown detector that the electric storage device is unusable, the controller unit is configured to perform emergency evacuation control that suppresses the power consumption of the rotation motor to be less than or equal to the power generation of the generator while maintaining voltage of a direct current bus greater than or equal to a normal operation voltage of a control system of the hybrid working machine.

Accordingly, when the electric storage device is unusable, the power consumption of the rotation motor is suppressed while the voltage of the direct current bus is maintained greater than or equal to the normal operation voltage of the system. Therefore, both stable rotation and hydraulic operation can be ensured.

When the electric storage device is working well, the regenerative power generated when the rotation speed is decreasing is stored in the electric storage device. However, when the electric storage device becomes unusable, there will be no storage device for the regenerative power, and a regenerative brake operation may not be normally performed.

In such a case, it is preferable that the hybrid working machine according to the aspect of the present invention further include a regenerative resistor that consumes regenerative power when the rotation motor is performing a regenerative operation; and a regenerative-resistor controller that controls the regenerative resistor. In this way, the regenerative power generated when the rotation speed is decreasing is consumed by the regenerative resistor, and a regenerative brake operation can be normally performed.

It is preferable that the hybrid working machine according to the aspect of the present invention further include a bus voltage detector that detects the voltage of the direct current bus. The electric-storage-device breakdown detector may detect that the electric storage device is unusable when the bus voltage detected by the bus voltage detector at start-up in a state in which the electric storage device is connected to the direct current bus is less than a set value.

In this case, the voltage of the direct current bus, which directly indicates the state of the electric storage device, is detected to determine whether the electric storage device is unusable. Therefore, not only the breakdown of the electric storage device itself, but also the unusable state of the electric storage device due to other reasons can certainly be detected.

DESCRIPTION OF THE PREFERRED EMBODIMENTS

A hybrid excavator will be described as embodiments of the present invention.

Figure 1:
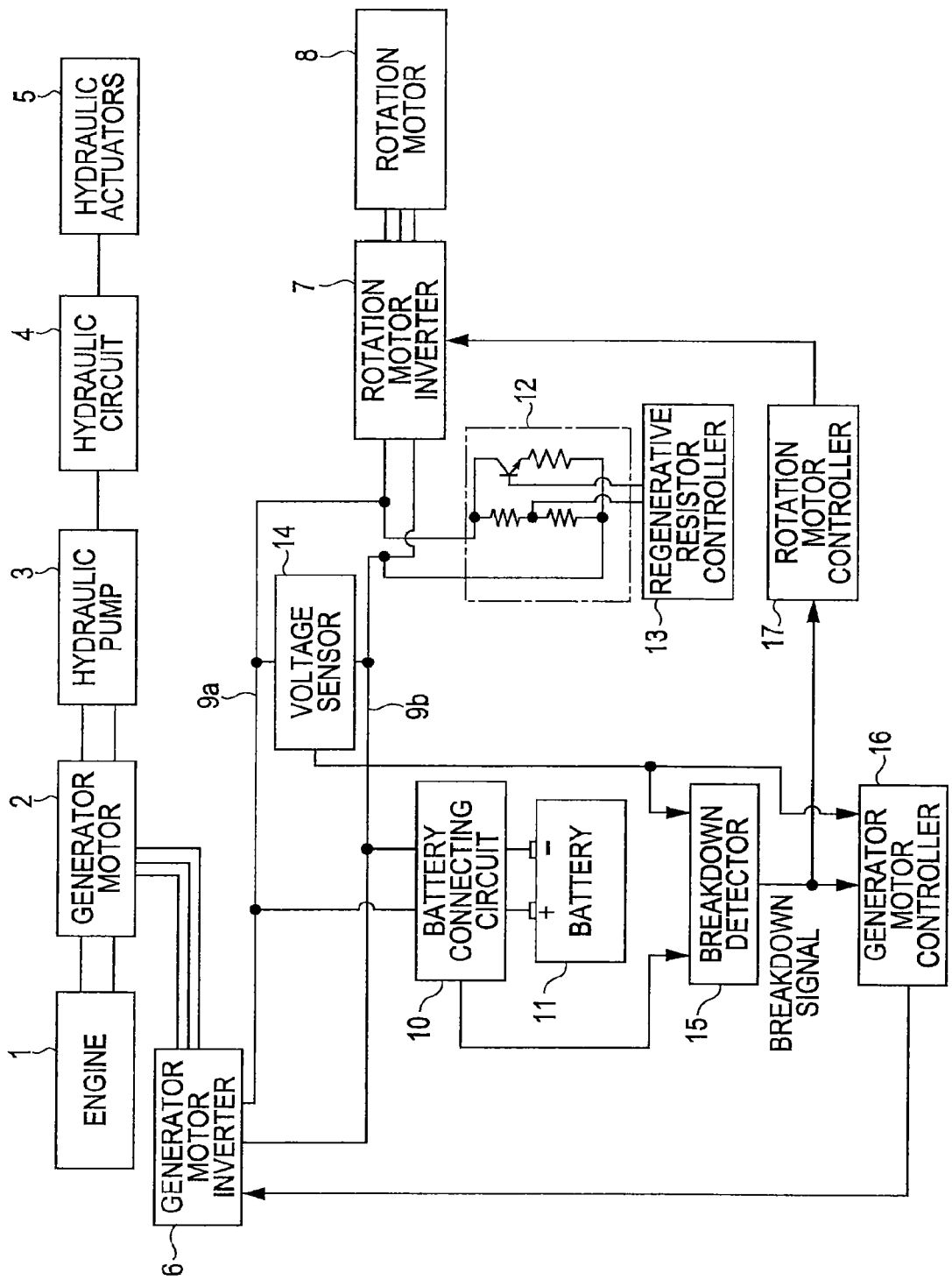
FIG. 1 is a block diagram of a hybrid excavator according to an embodiment of the present invention.

FIG. 1 is a block diagram of a drive system and a control system.

As illustrated in FIG. 1, a generator motor 2 that performs both a generator operation and a motor operation and a hydraulic pump 3 are connected to an engine 1 serving as a power source. The generator motor 2 and the hydraulic pump 3 are driven by the engine 1.

A boom cylinder and other hydraulic actuators (which are collectively given the reference numeral 5) are connected to the hydraulic pump 3 via a hydraulic circuit 4 including control valves (not shown). The hydraulic actuators 5 are driven by pressure oil supplied from the hydraulic pump 3.

In contrast, a rotation motor 8 is connected to the generator motor 2 via a generator motor inverter 6 and a rotation motor inverter 7 constituting a controller unit. A battery (electric storage device) 11 is connected via a battery connecting circuit 10 to DC buses 9a and 9b connecting the two inverters 6 and 7. The rotation motor 8 is driven by using the generator motor 2 and the battery 11 as a power source.

Also, a regenerative resistor circuit 12 that performs a regenerative brake operation by consuming regenerative power when the rotation speed is decreasing is connected in parallel with the battery 11 to the DC buses 9a and 9b. Also, a regenerative resistor controller 13 controls the regenerative resistance of the regenerative resistor circuit 12.

Besides the battery (main power source) 11, electric components such as a control system and a starter motor and an auxiliary battery serving as a power source of a working light (not shown) are provided as auxiliary power sources.

With continued reference to FIG. 1, a drive circuit and a battery circuit of the rotation motor 8 are indicated by bold lines so that they can be distinguished from other circuits.

The hybrid excavator further includes, in addition to the foregoing basic structure, a voltage sensor 14 that detects the voltage of the DC buses 9a and 9b, a breakdown detector 15, and a generator motor controller 16 and a rotation motor controller 17 constituting a controller unit.

The breakdown detector 15 determines whether the battery 11 is broken (unusable) on the basis of whether the voltage of the DC buses 9a and 9b, which is detected by the voltage sensor 14 at the time the system is started (at the time the key is switched on), is greater than or equal to a normal battery voltage (e.g., 150 V). When the breakdown detector 15 determines that the battery 11 is unusable, the breakdown detector 15 sends a breakdown signal to the generator motor controller 16 and the rotation motor controller 17, which perform predetermined control operation.

The details of this control operation will be described with reference to the flowcharts illustrated in FIGS. 2 and 3.

Figure 2:
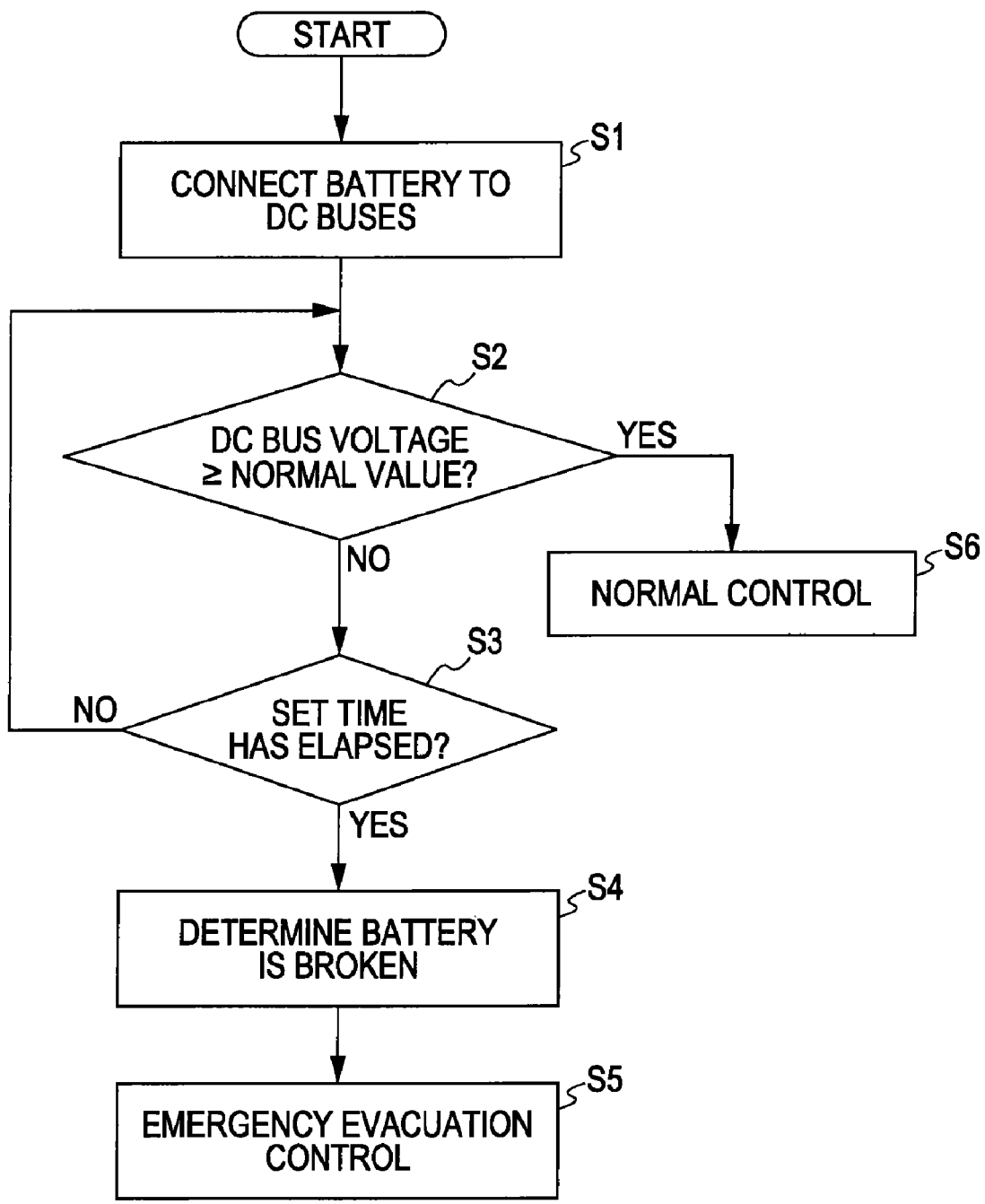
FIG. 2 is a flowchart illustrating a control switching flow of the excavator.
Figure 3:
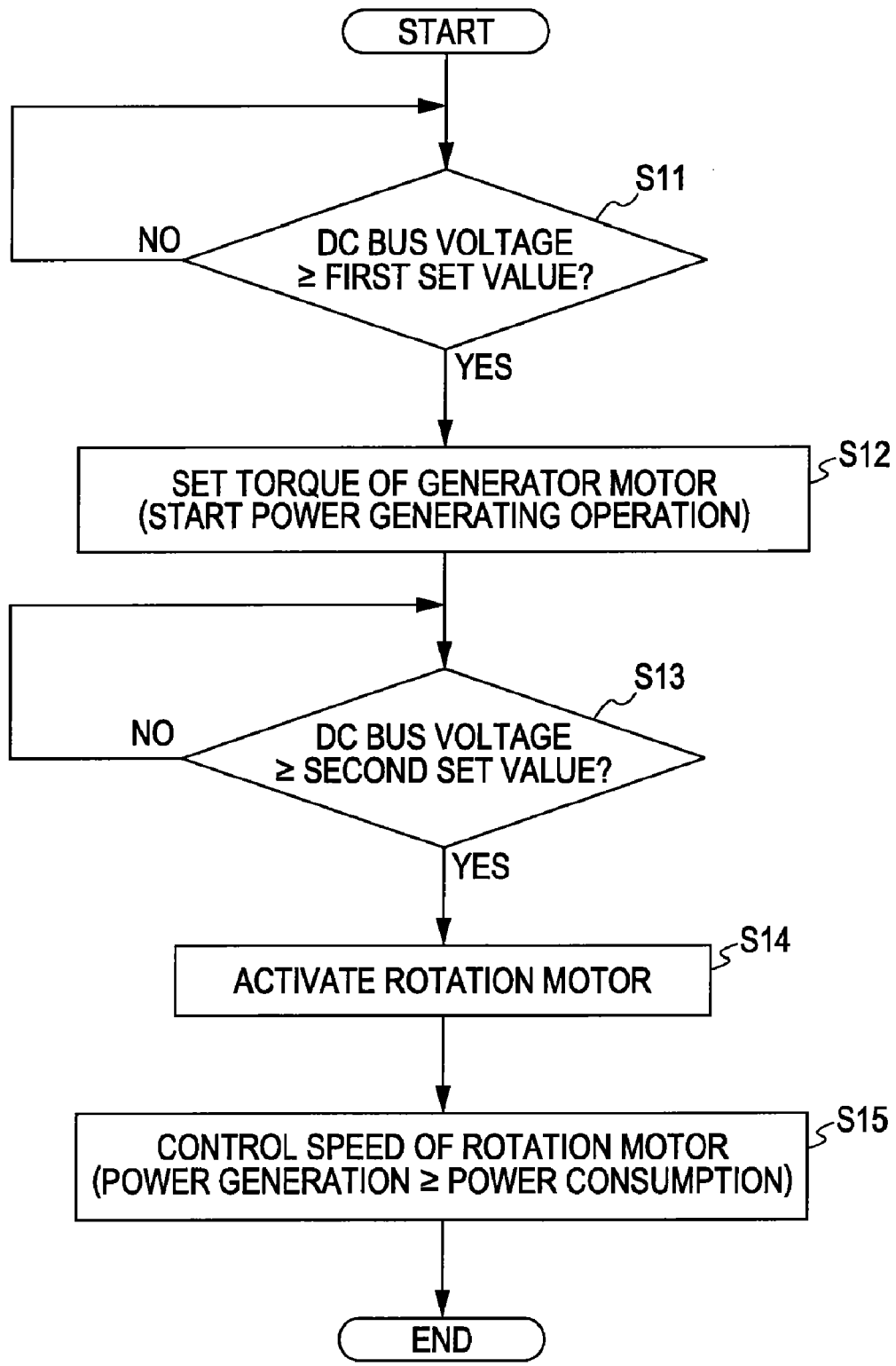
FIG. 3 is a flowchart illustrating the flow of emergency evacuation control of the excavator.
Figure 4:
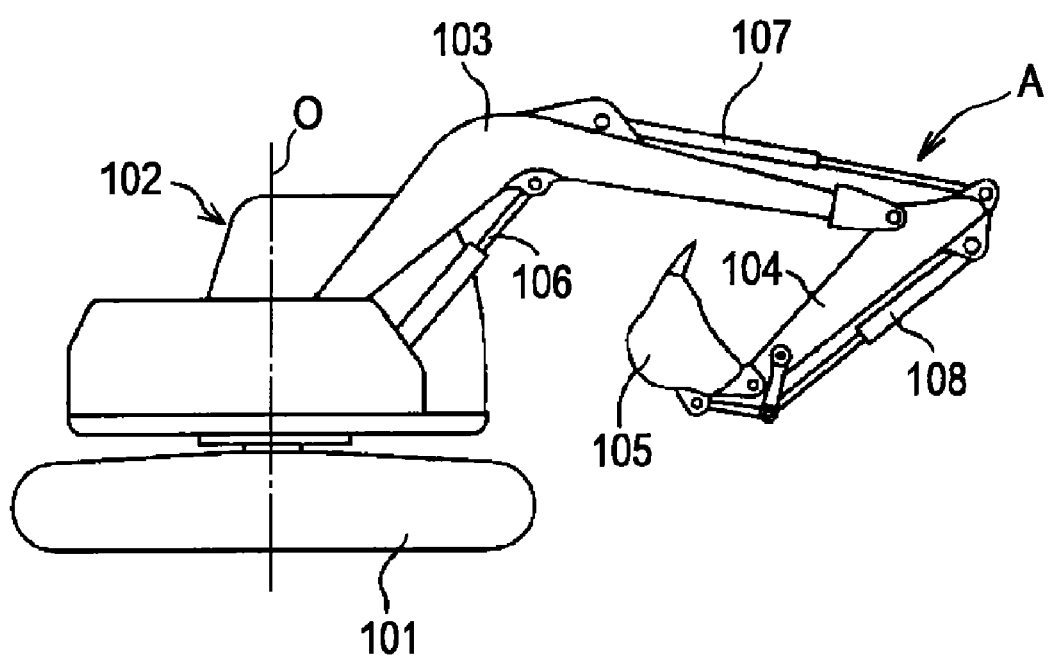
FIG. 4 is a schematic side view of the excavator.

FIG. 2 illustrates the flow of switching battery control between normal control and emergency evacuation control, and FIG. 3 illustrates the flow of emergency evacuation control.

In the control switching flow illustrated in FIG. 2, when the system is started by switching on the key, in step S1, the battery connecting circuit 10 connects the battery 11 to the DC buses 9a and 9b. In step S2, it is determined whether the detected voltage is greater than or equal to normal value (e.g., 150 V) indicating that the battery 11 is normal.

When the detected voltage is less the normal value even after a set time has elapsed since the battery connection (steps S2 and S3), it is determined that the battery 11 is broken, and the control is switched to emergency evacuation control (steps S4 and S5).

In contrast, when the detected voltage is greater than or equal to the normal value (YES in step S2), it is determined that the battery 11 is working well, and the control proceeds to normal control (step S6).

In the emergency evacuation control flow illustrated in FIG. 3, when the engine 1 is started by the starter motor, in step S11, it is determined whether the voltage of the DC buses 9a and 9b is greater than or equal to a first set value.

The first set value is a value that is approximately the electromotive force of the generator motor 2. When it is determined YES in step S11, in step S12, the generator motor inverter 6 sets the torque of the generator motor 2, and a power generating operation of the generator motor 2 is started.

In this case, the torque of the generator motor 2 is set and controlled so that the voltage of the DC buses 9a and 9b will be maintained greater than or equal to a normal operation voltage (second set value; e.g., 300 V) of the entire system when the battery 11 is working well.

In step S13, it is determined whether the voltage of the DC buses 9a and 9b has become greater than or equal to the second set value.

When it is determined YES in step S13, the rotation motor 8 is activated by the rotation motor controller 17, and the speed of the rotation motor 8 is controlled while regulating the speed or power (speed×torque) of the rotation motor 8 in accordance with the amount of operation of a rotation operating lever (not shown) so that the power generation of the generator motor 2 will become greater than or equal to the power consumption of the rotation motor 8 (step S15).

With the foregoing control, in a state in which the battery 11 is unusable, while the voltage of the DC buses 9a and 9b is maintained greater than or equal to the normal operation voltage of the entire system, the power consumption of the rotation motor 8 is suppressed to be less than or equal to the power generation of the generator motor 2. Accordingly, the rotation motor 8 and the hydraulic actuators 5 can be operated in a stable manner even with the minimum necessary power.

The regenerative power generated in the rotation motor 8 when the rotation speed is decreasing is fed to the regenerative resistor circuit 12 via the rotation motor inverter 7 and is consumed in the regenerative resistor circuit 12. Thus, a regenerative brake operation similar to that when the battery 11 is working well can be ensured.

In the above-described embodiment, the so-called parallel hybrid structure in which both the generator motor 2 and the hydraulic pump 3 are simultaneously driven by the engine 1 has been described by way of example. However, the present invention is also applicable to the case of a so-called series hybrid structure in which a generator is driven by an engine, and a rotation motor and a pump motor are driven by the power generated by the generator. Also in this case, advantageous effects similar to those achieved in the above-described embodiment can be achieved.

In the above-described embodiment, the generator motor 2 performing both a generator operation and a motor operation is used. Alternatively, a generator and a motor that are separated from each other may be used as a power unit.

Furthermore, the present invention is not limited to a hybrid excavator, and the present invention is also applicable to a crusher, a wrecker, or the like that is configured by using an excavator.

Although the invention has been described with reference to the preferred embodiments in the attached figures, it is noted that equivalents may be employed and substitutions made herein without departing from the scope of the invention as recited in the claims.

What is claimed is:

1. A hybrid working machine comprising:
   an engine serving as a power source;
   a hydraulic pump serving as a hydraulic power source of a hydraulic actuator, the hydraulic pump being driven by the engine;
   a generator driven by the engine;
   an electric storage device that is charged with electric power generated by the generator;

a rotation motor serving as a driving source of a rotating structure, the rotation motor being driven by the generator and the electric storage device;

electric-storage-device breakdown detecting means for detecting that the electric storage device is unusable; and control means for controlling the generator and the rotation motor, wherein, when it is detected by the electric-storage-device breakdown detecting means that the electric storage device is unusable, the control means is configured to perform emergency evacuation control that suppresses the power consumption of the rotation motor to be less than or equal to the power generation of the generator while maintaining voltage of a direct current bus greater than or equal to a normal operation voltage of a control system of the hybrid working machine.

2. The hybrid working machine according to claim 1, further comprising:

a regenerative resistor that consumes regenerative power when the rotation motor is performing a regenerative operation; and regenerative-resistor controlling means for controlling the regenerative resistor.

3. The hybrid working machine according to claim 1, further comprising bus voltage detecting means for detecting the voltage of the direct current bus, wherein the electric-storage-device breakdown detecting means detects that the electric storage device is unusable when the bus voltage detected by the bus voltage detecting means at start-up in a state in which the electric storage device is connected to the direct current bus is less than a set value.

* * * * *